Sept. 16, 1952 C. BRUNETTI 2,611,040

NONPLANAR PRINTED CIRCUITS AND STRUCTURAL UNIT

Filed June 23, 1947 6 Sheets-Sheet 1

Inventor

Cledo Brunetti

By

G. J. Kessenich, J. H. Church & H. E. Thibodeau

Attorneys

NONPLANAR PRINTED CIRCUITS AND STRUCTURAL UNIT

Filed June 23, 1947 6 Sheets-Sheet 2

Inventor

Cledo Brunetti

By G. J. Kessenick, J. H. Church & H. E. Thibodeau
Attorney

Sept. 16, 1952 C. BRUNETTI 2,611,040
NONPLANAR PRINTED CIRCUITS AND STRUCTURAL UNIT
Filed June 23, 1947 6 Sheets-Sheet 3
FIG. 7.
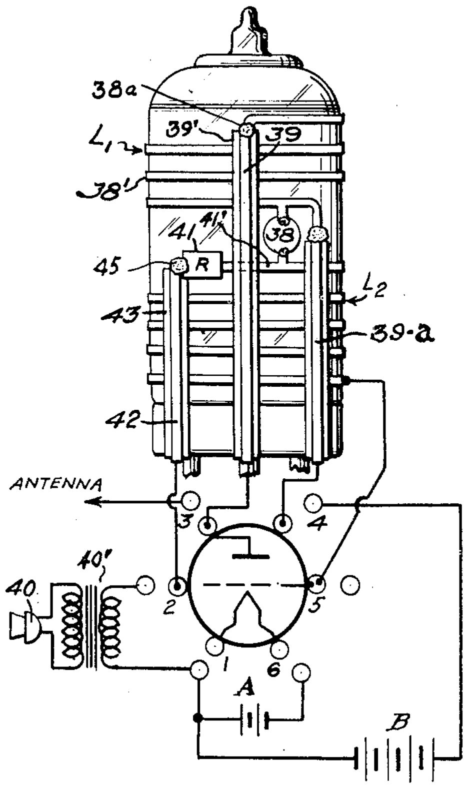
FIG. 8.
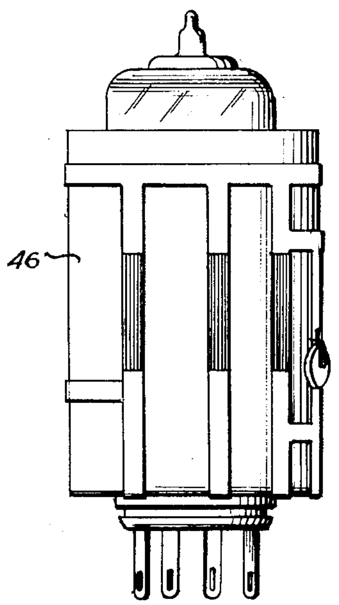
FIG. 9.
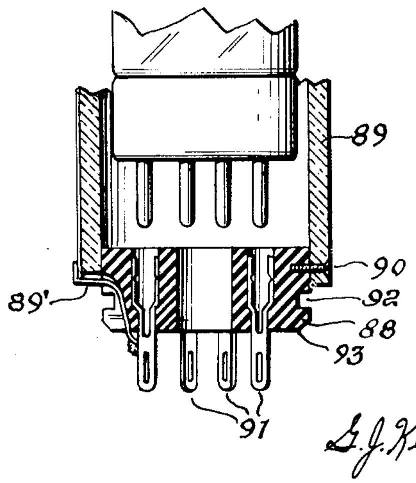
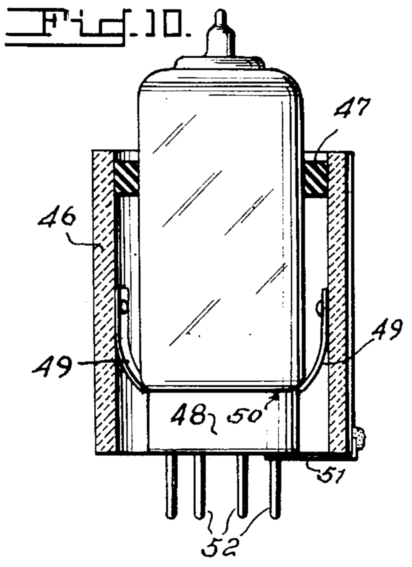
Inventor
Cledo Brunetti
By G. J. Kessenich, J. H. Church & H. E. Thibodeau
Attorney Sept. 16, 1952 C. BRUNETTI 2,611,040

NONPLANAR PRINTED CIRCUITS AND STRUCTURAL UNIT

Filed June 23, 1947 6 Sheets-Sheet 4

Inventor

Cledo Brunetti

By

G. J. Kessenick, J. H. Church & A. E. Thibodeau

Attorney

NONPLANAR PRINTED CIRCUITS AND STRUCTURAL UNIT

Filed June 23, 1947 6 Sheets-Sheet 5

Inventor

Cledo Brunetti

By

G. J. Kessenich, J. H. Church & H. E. Thibodeau

Attorney

COMPOSITION OF PAINTS

| | SILVER WIRING | | | | | | | RESISTORS | |
|---|---|---|---|---|---|---|---|---|---|
| BASES → | STEATITE | | GLASS | | | PHENOL-ALDEHYDES | METHYL-METHACRYLATES | STEATITE GLASS PHENOL ALDEHYDES | METHYL METHACRYLATES |
| PIGMENT | I POWDER SILVER PASTE 62 % | II SILVER OXIDE 76% | III SILVER PASTE 60% | IV SILVER OXIDE 76% | V SILVER OXIDE 92% | VI SILVER PASTE 80% | VII SILVER PASTE 35-65% | VIII GRAPHITE 15% | IX GRAPHITE 27.5% |
| BINDER | CELLULOSE LAQUER 15% LEAD BORATE 11.5% | RAW LINSEED OIL 4% LEAD SILICATE 12% | CASTING RESIN 15% | RAW LINSEED OIL 4% LEAD SILICATE 12% | RAW LINSEED OIL 3% | CASTING RESIN 15% | LACQUER BINDER 15-20% | PHENOL-ALDEHYDE LAQUER 29% | METHL METHACRYLATES LACQUER 54.5% |
| SOLVENT | ETHYL ACETATE 11.5% | MINERAL SPIRITS 6% | ETHYL ACETATE 5% | MINERAL SPIRITS 8% | | ETHYL ACETATE 5% | BUTYL CELLUSOLVE REMAINDER % | ALCOHOL ACETATE MIXTURE 47% | TOLUENE 9% |
| REDUCING AGENT | | | | | HYDRAZINE SULFATE 3% | | | | |
| FILLER | | | | | | | | LAMPBLACK 9% | LAMPBLACK 9% |

FIRING TEMPERATURE
I - 800°C
II - 800°C
IV - 450°C

DRYING TEMPERATURE
III - 60°C
V - 60°C
VI - 60°C
VII - 30°C
VIII - 150°C
IX - 30°C

Fig. 20.

COMPOSITION OF PAINTS

| CONSTITUENT | FUNCTION | EXAMPLES | |
|---|---|---|---|
| | | METALLIZING | RESISTORING |
| PIGMENT | CONDUCTING MATERIAL | POWDERED SILVER<br>SILVER OXIDE<br>SILVER NITRATE<br>POWDERED COPPER<br>COPPER SULFATE | COLLOIDAL GRAPHITE<br>FLAKE GRAPHITE |
| BINDER | HOLDS PIGMENT TOGETHER AND BINDS IT TO PLATE. MAY ALSO SERVE AS THE REDUCING AGENT | LINSEED OIL<br>COTTON SEED OIL<br>CASTOR OIL<br>ROSIN<br>LACQUER<br>FOR HIGHLY REFRACTORY BASE:<br>LEAD BORATE<br>LEAD BORATE<br>ETHYL SILICATE | PHENOL-ALDEHYDE RESINS<br>MELAMINE FORMALDEHYDE<br>VINYLITE RESINS<br>SILICONE RESINS |
| SOLVENT | DISSOLVES BINDER IF IN SOLID FORM AND ADJUSTS VISCOSITY OF MIXTURE | ALCOHOL<br>BENZENE<br>CARBON TETRACHLORIDE<br>KETONES<br>ACETATES | ALCOHOL<br>BENZENE<br>CARBON TETRACHLORIDE<br>KETONES<br>ACETATES |
| REDUCING AGENT | CONVERTS METALLIC SALT TO PURE METAL AT LOW TEMPERATURE | FORMALDEHYDE<br>HYDRAZINE SULFATE<br>HYDRAZINE SULFATE | |
| FILLER | INCREASES ELECTRICAL RESISTANCE BY SEPARATING PIGMENT PARTICLES | | POWDERED MICA<br>MINERALITE<br>ASBESTOS DUST (IRON FREE)<br>CARBON BLACK |
| PROTECTIVE COATING | PROTECTION AGAINST ABRASION AND ATMOSPHERIC CONDITIONS | | PHENOLIC LACQUERS<br>SILICONE RESINS<br>VINYLITE LACQUERS<br>MELAMINE FORMALDEHYDE LACQUERS |

Fig. 21.

INVENTOR
Cledo Brunetti
By G. J. Kessenich, J. H. Church & H. E. Thibodeau
Attorney Patented Sept. 16, 1952 2,611,040

UNITED STATES PATENT OFFICE 2,611,040

NONPLANAR PRINTED CIRCUITS AND STRUCTURAL UNIT

Cledo Brunetti, Silver Spring, Md., assignor to the United States of America as represented by the Secretary of War Application June 23, 1947, Serial No. 756,536

2 Claims. (Cl. 179—171)

(Granted under the act of March 3, 1883, as amended April 30, 1928; 370 O. G. 757)

The invention described in the following specification and claims may be manufactured and used by or for the Government for governmental purposes without the payment to me of any royalty thereon.

My invention relates to means for simplifying and lowering the cost of embodiment of electrical circuits, and for enabling the production and duplication of such circuits with absolute certainty of uniformity, and in forms which represent the highest degree of compactness and advantage in minimizing inter-circuit losses, signal distortions or other parasitic impairments. Specifically, it is an aim to enable the production of printed circuits, including couplings, on non-planar surfaces.

The invention is peculiarly valuable at present in electronic apparatus for producing or responding to Hertzian effects, but is applicable also in electrical devices generally. An example of the latter is the printing of various resistors with their accompanying connections on the cylindrical case of such an instrument as a voltmeter in order to adapt it to a number of ranges of potential. Specific applications to electronic devices will be illustrated which will make clear how it may be applied to other uses.

In order to simplify the production of electronic equipment, I apply printed or stencilled circuits to such non-planar surfaces as the non-metallic envelopes of electron tubes, the ceramic or other dielectric covers of such electrical components as I.-F. transformers, on metallic covers of such components when these have first been coated with non-conducting paint, the surfaces of plastic or other non-conductive cabinets, panels, chassis, sub-panels and supports, or such surfaces when made of conductive materials and given a non-conductive coating, and the like. Examples are illustrated in the drawings and hereinafter described.

The use of printed circuits affords mechanical precision in the construction of electrical or electronic circuits, when stencils, stamps or dies are used. Instead of trusting to the accuracy of an operator, the circuits are mechanically positioned to ensure correct connections. In addition to this advantage, much time is saved in assembly, and much space is saved in the equipment. All necessary fixed components for a radio frequency amplifier stage may be printed on the envelope of the amplifier tube, for example, affording a complete stage requiring no more space than the tube itself. Similarly, if a dual tube is used, with external circuit components printed on the envelope, a two-stage amplifier can be built in the space normally occupied by a single tube. This technique can be applied to tubes of various sizes, ranging from standard size to subminiature.

My method is particularly well adapted to printing coils on tubes, which may either be electron tubes as used in radio circuits, or may be pieces of dielectric tubing or tubing made of conductive material covered with a non-conductive layer. One method of imprinting the coil is to wrap a ribbon of paper, silk or other suitable material helically around the tube, as shown in Figure 14. The spacing between turns of the printed coil 1 is determined by the width of the ribbon; the width of the conductive material 1 is determined by the spacing between the turns of the ribbon and the pitch or inclination of the turns to a plane normal to the axis of the tube.

The methods I use for this purpose can be varied to suit conditions of manufacture. In one of my methods, a stencil is made of flexible material, such as a silk screen, and is clamped around a cylindrical, box, or similar shaped object upon which a circuit is to be printed (see Fig. 2). The stencil is sufficiently flexible to adhere readily to the contours of the object around which it is clamped. The conductive material is then coated onto the object through the stencil. The stencil is removed, as by unwinding, and the object is heated at relatively low temperature to drive out certain ingredients, such as solvents, from the conductive material. Resistive elements are similarly applied to the object, and disc-type capacitors are affixed to the metallic portions of the printed circuit, where necessary, using low-temperature solder and standard printed circuit techniques.

Alternatively, the printed circuits may be applied by rolling cylindrical objects under rubber stamps which have been coated with suitable conductive inks. Rubber stamps may likewise be used to apply printed circuits to relatively flat covers of I.-F. transformers. When necessary, the rubber stamps may be contoured to fit surfaces which are not flat; e. g., spherical or other concave surfaces. As another method, the circuit may be painted onto the surface manually, using a soft brush and suitable silver and carbon paints. The brush technique may be used to complete circuits which have been partially applied through use of other methods. For example, if leads are stamped onto four sides of a rectangular coil cover, connection between the circuits stamped on adjacent sides may be completed by the addition of metallic paint applied with a brush; or resistance material can be painted into the correct position of stencilled conductive circuits.

It is an important aim of the invention to present a novel stage unit for radio transmitters and receivers in which a tube and related circuits are embodied as a single member of the same size as the tube alone.

A further important aim is to so devise this embodiment that it may be practicably reproduced in quantity rapidly and accurately with a minimum requirement of skill on the part of the workers employed thereon. I am aware that the provision of a coil within the envelope of a conventional tube has been proposed, as in the patent to Hull, 1,114,697, for a specific purpose distinguished from the utility of my invention, and not applicable to the uses here disclosed. But in the present state of the art the carrying out of the construction illustrated in the patent is not practicable commercially if it can be constructed at all.

My invention in certain forms is applicable to the rapid and certain carrying out of instructions for alterations in extensive electrical systems such as television systems circuits, communications circuits, and for unit changes throughout organizations which have numerous electrical or electronic apparatus units scattered over wide areas.

Thus, in organizations such as those in the military and naval services, when issuing instructions to groups in the field, requiring that certain electronic circuits in existing equipment be altered, it is common practice to issue a printed list of the necessary component parts, together with detailed instructions and a pictorial and/or schematic diagram. The technical personnel then requisition the required parts and follow the instructions and diagrams with a degree of accuracy determined by their skill, the need for haste, and the degree of fatigue from which they are suffering. It is evident, and is a matter of common knowledge, that perfect results are not universally attained.

My invention, hereinafter described, is intended to overcome this condition and is also applicable to other uses, such as publication in books and periodicals for the instruction of students of the electronic arts and for the enjoyment of the hobbyist.

By using my first-mentioned method, the task of the recipient is greatly simplified, for the circuit may be issued to him complete, all necessary resistors being printed on the supporting sheet, and capacitors provided by coating two sides of the sheet with conductive ink covering the desired area. Connection between a lead on one side of the sheet and a condenser electrode on the other side is made with an eyelet, a staple, or similar simple device. Coils are similarly coated on one or both sides of a sheet, which is then bent to form a cylinder and the edges fastened together, after which the lines are caused to form a complete helix through the addition of a drop of conductive ink at the point of juncture.

In addition to those above indicated, additional objects, advantages, and features of invention reside in the construction, arrangement and combination of parts, and in steps of procedure in the embodiment of the invention, as will appear or be understood from the following description and the accompanying drawings, wherein.

Figure 3:
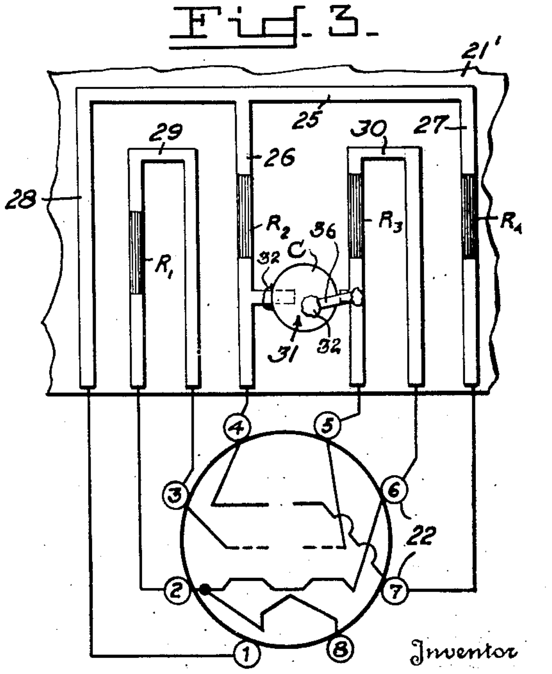
Figure 3 is a developed plan of the whole printed circuit, and a diagrammatic showing of the leads from the printed circuit to the prongs or pins on the tube base.
Figure 3A:
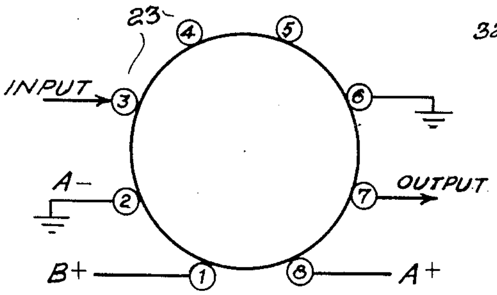

Figure 3–*a* is a diagram of the leads to the socket.

Figure 4:
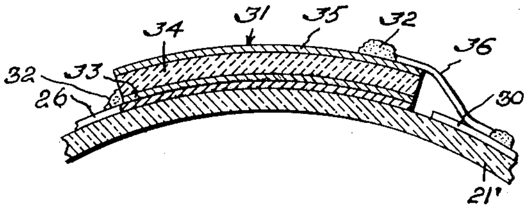
Figure 5:
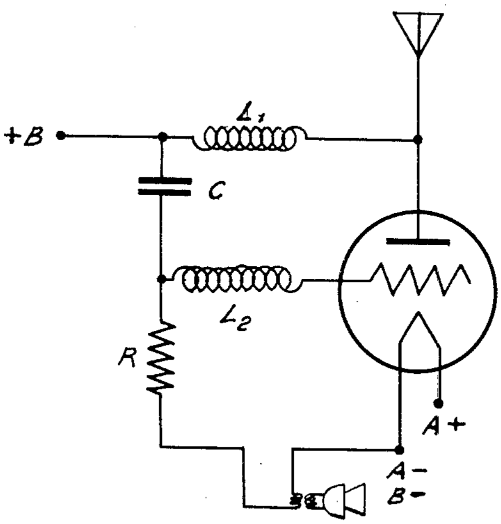
Figure 6:
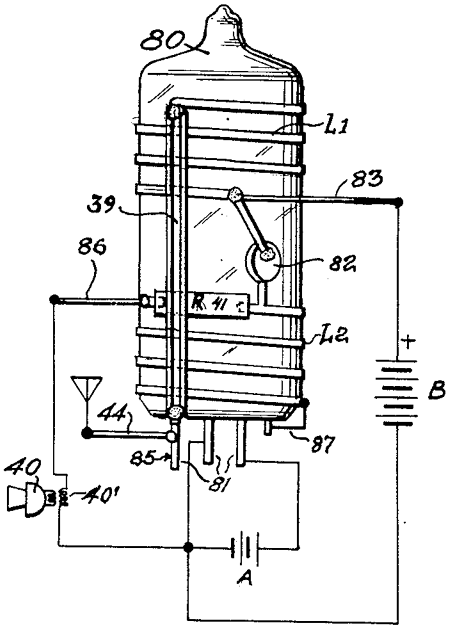
Figure 6A:
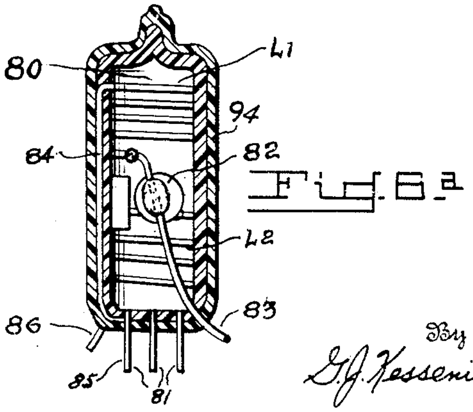

Figure 4 is a detail section of the curved condenser of Figure 3 and its mounting on the printed tube;

Figure 5 is a conventional circuit diagram for a single stage transmitter which is to be embodied in a self-contained tube unit;

Figure 6 is an elevation of a tube on which the transmitter has been embodied mainly by a printed circuit including oscillator coils;

Figure 6–*a* is an elevation of a tube and circuit with an enclosing matrix-case in section;

Figure 7 is a view similar to Figure 6 of a conventional tube and base with such a circuit and including a diagram of the terminal connections between the printed circuit and tube pins and the leads to socket connections.

Figure 11:
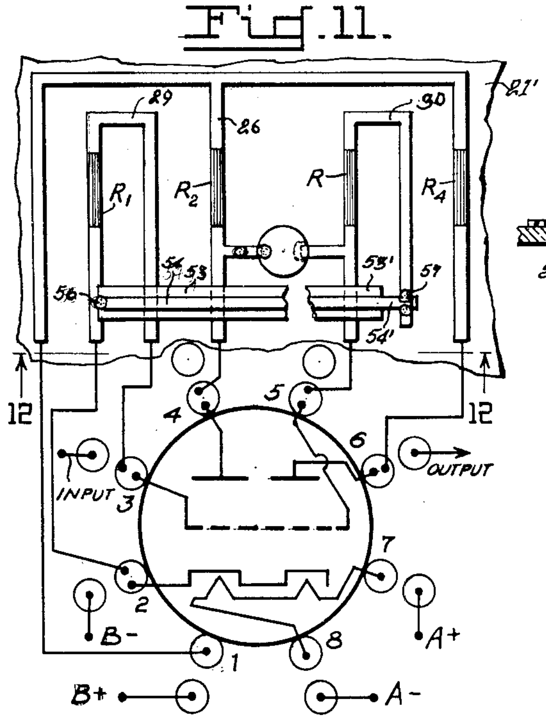
Figure 12:
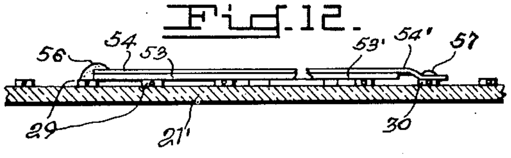
Figure 13:
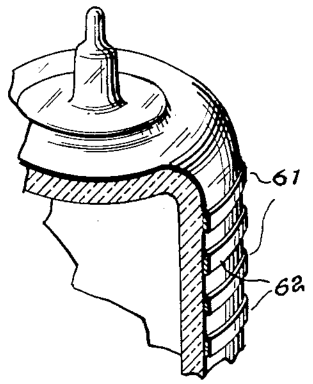
Figure 14:
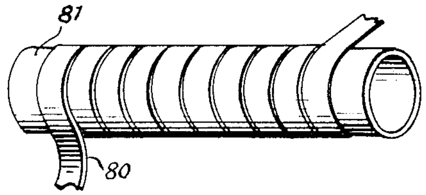
Figure 15:
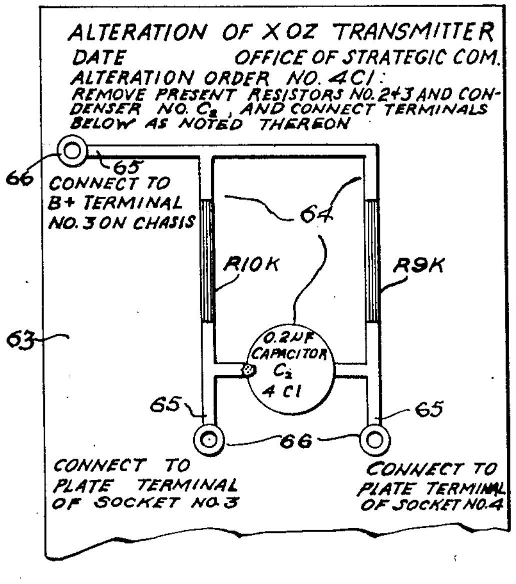
Figure 16:
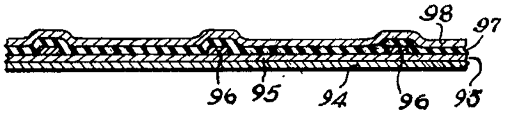
Figure 17:
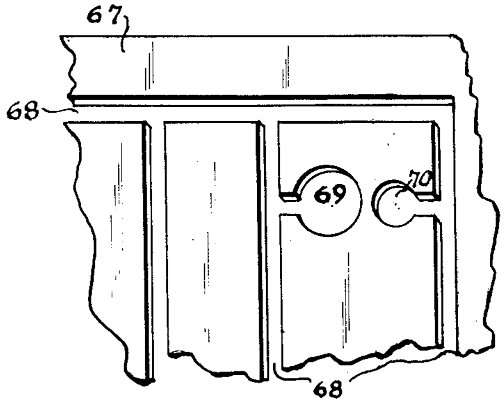
Figure 18:
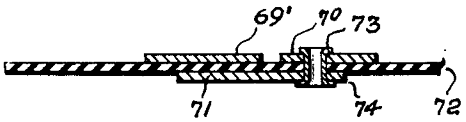
Figure 19:
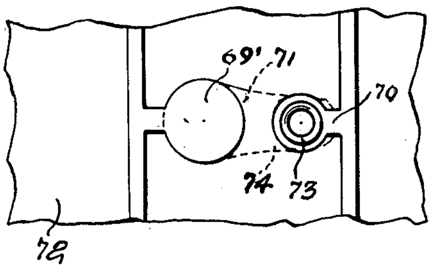
Figure 22:
Figure 24:
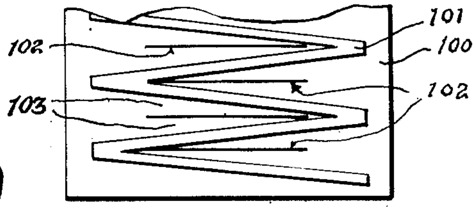
Figure 23:
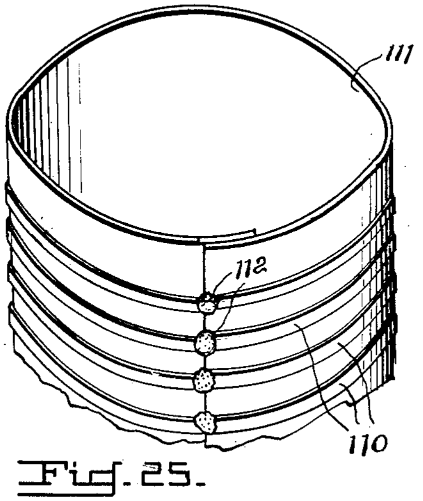
Figure 25:
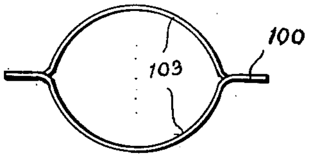

Figure 8 is an elevation of an attachable insulated cylindrical unit for tubes, with a printed circuit, coordinated with the related tube;

Figure 9 is a section of the unit of Figure 8 assembled;

Figure 10 is a similar view of a modification showing a manner of supporting the ceramic unit on a conventional tube and means for connecting the printed circuit with the prongs of the tube;

Figure 11 is a figure similar to Figure 3 showing a cross-over expedient;

Figure 12 is a sectional view of the cross-over of Figure 11;

Figure 13 is a fragmentary elevation of a radio tube having an inductance printed thereon and magnetic material applied to increase the flux density;

Figure 14 is a schematic view illustrating procedure in applying a printed coil to a cylindrical body;

Figure 15 is a plan of a combined instruction sheet and attachable printed circuit unit;

Figure 16 is a section of a decalcomania printed circuit sheet;

Figure 17 is a fragment of a flexible stencil sheet by which a printed circuit may be applied to a non-planar surface;

Figure 18 is a section through a condenser and printed circuit;

Figure 19 is a plan of the part in Figure 18;

Figure 20 is a table of formulas, the support surfaces to which the formula materials are suited and the appropriate drying or firing temperatures;

Figure 21 is a table of materials available according to their functional uses in circuit printing;

Figure 22 is a plan of a part of a printed coil sheet;

Figure 23 is a fragmentary perspective of the completed coil formed with the sheet of Figure 22;

Figure 24 is a plan of part of a modified printed helix sheet;

Figure 25 is an end view of the sheet of Figure 24, in the course of shaping.

Figure 1:
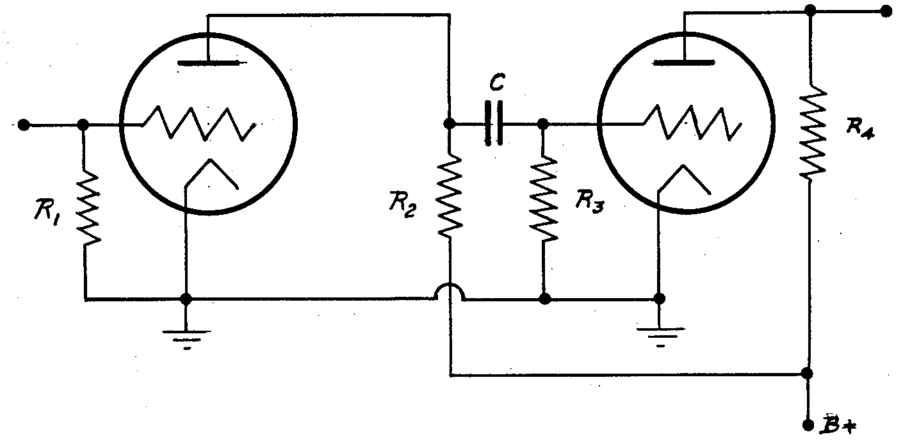
Figure 1 is a conventional diagram of a basic resistance-capacitance coupled two stage amplifier which it is desired to embody in a self-contained tube unit.

Referring more particularly to the drawings, there is shown in Figure 1 a conventional resistance-coupled two stage amplifier circuit which may be readily embodied by elements printed directly on the walls of a twin triode tube of conventional construction. The nature of the circuit shown is well understood and requires no description.

Figure 2:
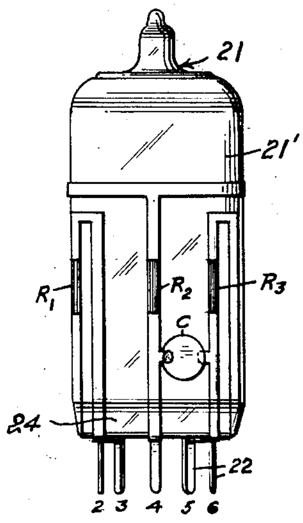
Figure 2 is an elevation of a tube on which the equivalent circuit has been printed.

In Figure 2 there is shown an elevation of such a tube, 21, as heretofore constructed, in which the equivalent of the circuits of Figure 1 has been printed on the wall 21' of the envelope. In Figure 3 the plan of the printed circuit is shown in full, together with the tube elements and respective prong terminals 22 represented diagrammatically, the socket receptacles 23 and their respective leads being additionally indicated in Figure 3–a.

The vacuum tube 21 of Figure 2 is of conventional construction, and while it is represented as a glass tube, a metal tube having a coating of insulating enamel or a tube with ceramic envelope may be used with the same printed circuit thereon. The envelope illustrated is cylindrical throughout a major portion of the length of the tube although this is not essential. The base 24 of the tube is also conventional and may have as many as eight prongs (or more) 22 projecting longitudinally from the bottom side, so that conventional sockets wired with conventional chassis leads may be used, although the chassis may also be printed in accordance with developed practices, if desired.

It should be remembered that in some forms my invention may alternatively be embodied without the use of conventional sockets, (see Fig. 6) but lead wires may be soldered to and extended from abbreviated prongs or to points on the envelope itself or to other units which themselves may be similar to the one from which the leads are extended, or otherwise as required. These connections may include chassis or housing terminals, such as the "B" and "A" supplies and microphone input or speaker output terminals. In such construction the leads between units may be wire or ribbon capable of supporting or partly supporting or steadying the tubes in place on temporary supports such as wadding, during assembly, to be subsequently embedded in plastic dielectric material. Non-conventional sockets specially devised with or without prong receptacles may also be used as found expedient, in conjunction with direct leads to prongs and between prongs and tube elements as required.

As shown in Figure 3, the printed circuit has its conductors and couplings so rearranged that no cross-overs are involved, and the conductors are all vertical principal ones, with a top transverse B+ bar 25 across the top above the other parts of the printed circuit, from which are extended downwardly the vertical leads 26—27 to respective plate-connected prongs of the tube. The left end of the B+ bar is connected by a vertical extension 28 to the No. 1 prong of the tube.

A first triode grid resistor loop 29 having resistor R1 therein is arranged in the form of an inverted U under bar 25 between the vertical conductors 26 and 28, one arm of which is connected to the grid-connected prong No. 3 and the other to the cathode-and-filament-connected prong No. 2 of the tube. The lead 26 to the left hand plate-connected prong No. 4 of the tube has resistor R2 in its upper part. Between this plate lead 26 and the vertical printed lead 27 to the right hand plate, another inverted U-shaped resistor loop 30 is printed on the tube wall, having resistor R3 in its upper part. The lower ends of this loop are connected respectively to the right hand grid-connected prong No. 5, and the right hand cathode-connected prong No. 6. The vertical lead 27 to the right hand plate has resistor R4 therein and is connected to the plate-connected prong No. 7. For the purpose of illustration, the cathodes are shown as indirectly heated, and cathode prong No. 2 is internally connected to the filament ground prong while the opposite filament lead in the tube goes to prong No. 8, to the socket receptacle for which a heater supply lead may be extended. Alternative hook-up expedients for the filament may be practiced where permissible to enable the utilization of the tube as desired, determined by the internal connections of the tube.

In Figure 3–a, the conventional connections to the socket receptacles for the tube prongs of Figure 3 are indicated.

In Figure 3 a capacitor 31 is shown connected between the left hand plate lead 26 and the loop 30, below resistors R2 and R3, and in Figure 4 a section thereof is shown enlarged.

The conventional ceramic disc forming the dielectric between the electrodes, is shown as bent to conform to the cylindrical wall surface of the tube as at 34. On the under side the lower electrode 33 is shown held by the solder 32 to the printed circuit part of lead 26, while at the upper side a foil strip lead 36 is attached by solder to the upper electrode 35 and to the printed part 30.

In Figure 5 there is illustrated a familiar basic circuit diagram of an oscillator and voice modulator, the elements and function of which will be sufficiently understood from the drawing without detailed description. My invention has enabled the embodiment of the unit of Figure 5 complete except for the electrical power and modulating sources on a conventional sub-miniature or micro size or large standard radio vacuum tube, so that the complete unit may be connected into a complete transmitter system by inserting the prongs of the tube in a conventional socket from which conventional or printed leads are extended; or otherwise connecting the tube in the circuits.

In Figure 7 continuous printed spiral lines 38' are printed on the wall of the tube to form the primary and secondary coils L1 and L2 of Figure 5 at the upper and lower portions of the tube envelope, spaced apart longitudinally a suitable distance, the proximal terminals of the coils having a condenser 38 connected therebetween, which may be of the same construction as the one 31 before described. The far terminal of the primary L1 has the plate lead 39 connected thereto. This lead is here shown as a printed conductor 39 on a dielectric crossover strip 39' laid over the coils printed on the tube, and connected by a spot 38a of solder to the coil. The lower end of the coil L1 is similarly connected as at 39–a to the number 4 prong, to which the B+ connection is made through the socket as indicated in the circuit diagram of Figure 7. The upper end of the lower coil L2 terminates with a short lead 41' beyond the condenser and has continued therefrom a resistor 41, printed on the tube surface. From the outer end of this resistor a crossover lead 42 is extended downward as part of the voice modulation input, this lead being a printed conductor on a dielectric ribbon strip 43 laid over the coil L2. The conductor 42 is connected by solder 45 to the resistor, and to the No. 2 prong of the tube. The lower end of coil L2 is connected to the grid through the No. 5 prong of the tube, by foil strip and solder. No external lead need be carried to the socket for the No. 5 prong (the grid bias being established through the coil L2, resistor 41 and secondary of the transformer 40' of the microphone 40 to the B negative pole). The A battery connections may be conventionally made through the socket to prongs numbers 1 and 6 for the filament, and in the present instance one of the A leads to the socket may be common with the B negative lead and the lead from the remaining terminal of the secondary of the microphone transformer 40'. The antenna connection is effected through the socket to the No. 3 prong of the tube.

On account of the exceeding small size of the sub miniature tube, the tube and transmitter unit of Figure 7 may be more simply embodied as shown in Figures 6 and 6–*a*, for use without employing a conventional tube base and socket.

In Figure 6 (which has been enlarged four or more diameters for convenience in illustration), the coils and resistor are printed on the tube 80 and the capacitor coupling effected as before described and shown in Figure 7, and the plate lead 39 from the coil L1 to the plate-connected prong 85 may also be the same. The voice input lead 42, however, is replaced by a wire or foil strip 86 soldered to the outer end of the resistor, which may be extended as required and conventionally connected to the transformer 40'. The lead to the antenna is also shown as a wire or foil 44, soldered directly to the plate prong 85 of the tube. The B+ lead 39–A, Figure 7 from the upper coil L1 is replaced by a wire or foil strip 83, soldered to the coil and extended directly away from the tube and conventionally connected to the battery.

In this case the number of prongs may be reduced to those actually needed for effecting connection with the internal elements of the tube, and so in effect, only three principal prongs 81 are required (two for the filament A battery leads and one for the plate, one of the filament prongs being used to connect also the leads from the B negative terminal and the secondary of the modulating transformer 40'), as shown in Figure 6, although a short outlet from the grid is shown connected with the printed continuation of the lower end of the L2 coil at 87. The connections between the transformer, the A and B batteries and the pins as mentioned may be effected by wires soldered to the pins.

The tube of Figure 6 as well as the one of Figure 6–*a* described below, are specially suited to those practices where the tube and circuit elements are embedded in a plastic matrix in the final production assemblies.

Another method of effecting cross-over connections with good insulation is shown in Figure 6–*a*. This consists in printing the body of the circuit, as, for instance the coils of Figure 6, applying the resistors and condensers and connecting all input and output and cross-over lead wires or foil strips to the printed circuit by solder at the proper places, then dipping the assembly in a thick casting syrup of suitable plastic adapted to dry to a high dielectric condition, keeping the attached conductors free of the syrup except where attached, then leading the bare (or insulated) wire or foil to the tube pins, where that is required (as, for instance, at 84, which corresponds to the crossover 39 of Figures 6 and 7), attaching them, and extending the others as external leads or tap wires. The whole of the Figure 6 unit may then be again dipped in the syrup, keeping only the ends of the external leads free, so that when the syrup dries the whole unit will be enclosed in a hard dielectric jacket, 94 Figure 6–*a*, holding the external parts and leads securely in place, protected from injury or displacement. The necessary external connections may then be made conventionally. The same practice may be largely carried out in the unit of Figure 7 and other forms of the invention, to protect an assembled unit from the disturbance of external electrical elements, lead wires, printed elements, etc.

In Figure 8 there is illustrated an embodiment of the invention by which production units of printed circuits may be effected, attachable to tubes without printing the circuits directly on the tubes. This enables the printing of the circuits on ceramic or other rigid or fairly stiff elements less frangible and which may be baked to harden the printed parts without harming tube parts and thereafter slipped on to the proper standard or special completed radio tube and a few connections made between terminals of the printed circuit and appropriate prongs of the tube, after which proper chassis circuit leads to the tube socket may be made, in accord with the preceding description herein. In this instance, a hollow, open-end cylinder 46 (which may be considered an auxiliary envelope) is produced by conventional manufacturing process, which may include baked clay, procelain, or the like, or may include a heat resistant plastic, or a coated woven glass fiber structure with an appropriate external smooth surface adapted to readily receive printed circuit lines and elements as herein described. A cylinder of moderately flexible plastic may also be used which will yield to eccentric deformation to a reasonable degree without injury. The cylinder may be made of slightly larger diameter than the radio tube to which it is to be applied, and within it—after printing and baking of the circuit elements—a soft rubber ring 47 (such as sponge rubber), may be snugly fitted, and cemented if desired, the internal diameter of which is somewhat less than the external diameter of the tube on which the device is to be fitted. See Figure 10. Thus, when slipped onto a tube, the ring will frictionally bind on the surface of the tube and so hold the cylinder 46 in place. Such rings may be located at top and bottom of the cylinder, if desired, so as to engage the upper wall and the base of the radio tube, or, spring tongues 49 may be riveted to the cylinder on its inner side, inclined inwardly and longitudinally toward the end of the cylinder, so as to yieldingly bear against the side of the radio tube just above its base 48, against which the ends of the tongues will engage to support the printed unit positively at the proper height, by the ends of the tongues setting against the shoulder 50 usually afforded by the tube base. The connections between terminations of the conductors of the printed circuit on the cylinder 46 may consist of wire or strap leads 51, attached by solder to the printed circuit and to respective prongs 52 of the tube base, or such leads may be extended to appropriate parts of chassis circuits, or otherwise as required in the particular case.

A preferred mounting for the attachable unit is shown in Figure 9 where a standard tube socket 88 either adapted to be set in a chassis bed plate or otherwise shaped for mounting in circuit apparatus, has fixed therearound a cylinder 89 generally the same as the one 46, and with a similar or other circuit printed thereon. In this instance the cylinder has a number of screws 90 engaged through its lower edge portion impinging on the socket 88 so as to fix the cylinder in place. Connections between the printed circuit on the cylinder and respective socket contacts 91 of the socket may then be made through longitudinal slots on the side of the socket, as at 89, or in conventional ways found expedient. A standard tube may then be engaged in the socket without requiring special fabrication of leads and prong connections. By forming the channel 92 and reduced lower end 93 on this socket, it may be mounted in the conventional manner in chassis plates.

In Figure 11 an equivalent of the circuit of Figure 3 is shown coordinated with the prongs of a conventional tube base, but utilizing a cross-over and leads from the printed circuit so arranged that an eight-pin base for use in standard tube sockets may be employed. The cross-over may be of the nature before described or, as shown in this figure, may comprise a length of fiber ribbon 53 suitably impregnated and having thereon the printed medial line 54 of conductive ink or paint throughout its length. Such ribbon may be made up in rolls and cut off in the desired lengths or strips to extend between the vertical conductors to be connected and so constitute connectors. The ribbon may be secured in place by adhesive of any suitable kind, as before indicated, and also by solder forming the connections. It is an advantage of the use of preapplied adhesive on the under side of the ribbon, that the subsequently applied solder will not be liable to become insulated from a conductor by excess adhesive under the applied strip.

In Figures 11 and 12 at the right, a modification of the manner of forming the cross-over is indicated, in which a ribbon insulator 53′ is laid and cemented across the conductors to be crossed, stopping short of the ones to be connected, and then a separate ribbon strip 54′ of metal foil is laid thereon and secured at each end (one being shown) to the respective one of the conductors to be connected, by means of solder as at 57.

In Figure 13, a means is indicated for increasing the inductive effectiveness of a printed coil in a novel way, which consists in printing the inductor coil 61 on the envelope substantially as shown and described in preceding figures, and also printing between the turns of the coil intervening lines 62 of an ink or paint containing a substantial amount of magnetic material. The width and thickness of the magnetic ink lines will determine the degree of concentration of flux produced, it is found. The magnetic material is preferably a high colloidal suspension in an appropriate solvent and binder. This comminuted magnetic material imports a high advantage in elimination of eddy currents as compared to solid cores or continuous metal between the inductor coils.

In Figure 15 there is illustrated a method by which instructions for modification of circuits in electrical or electronic apparatus may be distributed among employees in the field at scattered points, and in which the instruction sheet itself may bear a printed circuit to replace or supplement elements of apparatus already in use, with special means for connecting the sheet itself into a chassis hook-up with great certainty as to the carrying out of the instructions and the desired improvement. In this instance a sheet 63 suitably impregnated and of a size somewhat larger than required for the printed circuit detail to be disclosed, has printed a reference designation of the circuit or instrument to be changed, and other data, to enable systematic administration and technical procedure. A circuit detail 64 is formally symbolized, which may be varied as the circumstances dictate. This circuit detail has terminals 65 at proper points which may be connected into the given prior apparatus involved, and to enable such connection physically and by common expedients, such as by binding screws, soldering, or otherwise, eyelets 66 are engaged in the sheet at these points so that their downturned flanges bear on the conductive ink of the printed circuit. Adjacent each of these eyelets there may be printed on the sheet instructions as to the particular parts of the prior apparatus they are to be connected to, which will vary with the art or nature of the apparatus and the particular model involved.

Figure 16 is an illustration of a decal. Here, a temporary support 94 has a suitable transient surface 95 suitable for the printing of a circuit 96, which may be applied to some specified surface as the external wall surface of a vacuum tube having a cylindrical wall, or a part of a case, or a chassis plate together with the necessary resistors, inductors, etc., and the whole is then covered with a high dielectric coating 97, which is waterproof, and upon this there is applied the adhesive 98 of such character as may be chosen.

In Figure 17 there is illustrated an example of stencil by which circuits may be applied by brush to non-planar surfaces. In this instance a tough sheet 67 of flexible material such as is commonly used for forming stencils has the outline of the desired circuit cut therein, as indicated at 68, for forming conductors, and between two bars there is an exemplification of an enlargement 69 of a terminal to permit the formation simultaneously therein of one electrode 69′ of a condenser shown in Figure 18. After the brushed circuit applied through this stencil has dried, or before, the remainder of the condenser may be made up in accordance with Figure 4, by applying an insulation over the electrode 69′, with a foil electrode similar to the one 33 or 35, connected by solder to the short terminal 70 indicated in the stencil.

In Figures 18 and 19 it is shown how the capacitor indicated at 69 in Figure 17, may be completed by applying an electrode disc or printed electrode 71 to the opposite side of the sheet 72 to which the circuit is applied under the electrode formed at 69′, and then an eyelet 73 engaged through the sheet to form a connector between the conductor terminal 70 and the underlying tongue part 74 of the electrode 71. The disc 71 may in such case be printed, or may comprise foil, and a coat of protective varnish or cement may be applied thereover.

In Figure 14 a procedure for the formation of continuous printed inductor lines on a cylindrical surface (as, a tube, or ceramic cylinder) as indicated, in which as a preliminary a ribbon 80 of suitable width is wound spirally around the surface of the tube 81 shown, the interstices between the turns of the ribbon determining the width of the conductor turns forming the inductor. The ends of the ribbon being temporarily secured, a suitable conductive ink or paint is then sprayed, painted or otherwise printed or applied over the interstices to such length as required, after which the ribbon 80 is removed, and remaining elements of the printed circuit applied to complete the desired unit on the surface chosen.

In the production of a cylinder having induction coil or coils extending around it, it is contemplated to print inclined rectilinear lines 110 as coil turn elements on a flat sheet 111 (see Fig. 22) having a width at least equal to the circumference of the desired cylinder and then curving and joining opposite edges of the sheet so as to bring the end of one line into registry with the opposed end of the next line at the juncture, thus forming a helix, electrical continuity being effected by application of a spot 112 of solder at each junction of the coil lines (see Fig. 23). The abutting or lapped edges may be secured together by cement, in conventional ways.

Suitable inks, paints and coatings for printing conductors as well as for printing resistors are known and may be used substantially in accordance with prior usage for applying the printed circuits in my invention as adaptable to the details here disclosed.

Conductive and resistive components, binders and solvents may be selected as most appropriate.

My printing ink or coating has included a substantial component of silver, and for that reason the solder used for such printing preferably contains a saturation of silver. Customarily I use a conventional resin cored solder of standard composition for radio hook up uses, with an added 2% of silver by weight, which is sufficient to saturate the solder against absorption of further silver. The melting point of the solder is adjusted by its alloy to suit the support for the printed circuit. Some or all of these silver inks include suitable binder to permit their ready thermal bonding to an underlying surface at moderate temperatures where necessary, although in some point of my invention this is not a requisite and high fusing temperatures may be there employed.

The table in Figure 20 illustrates a typical range of formula for circuit printing inks or paint and resistors, according to the nature of the support, with appropriate baking or drying temperatures indicated. The silver paste named may be one which is available commercially for such purposes, but in any event comprises silver powder essentially with a small amount of a liquid medium which, upon drying of the mixture, will not materially diminish the conductive value of lines printed therewith.

The table in Figure 21 illustrates the utilization of various materials having qualities, or characteristics or properties useful in preparing printing coatings or lines for printed circuits, and affords a range of selection to enable fitting the paint or ink to the material which forms the supporting surface.

A variation in the method of application is offered by the possibility of selecting the metallic salts so that metal films of different colors may be deposited, thus allowing the printing of colored electronic circuits. Circuits of different colors may be used for identifying different sections in a multi-section unit, for classifying as to frequency and volume range, and other uses.

A method for applying the metallic wiring by evaporation of the metal is to place the insulating plates on a tray over a crucible, the bottom of which is provided with a suitable grid structure which supports the plates yet allows the metal evaporated from the crucible below the tray to reach the plate. The plates are covered with suitable circuit-defining stencils (Fig. 17) which may be removed after the evaporation operation.

Referring to Figure 24, a sheet 100 is printed with a zigzag conductive line coating 101, either before or after the sheet is cut with slits as at 102. After the sheet has been printed and cut, it is deformed as shown at Figure 25, in order to shape the printed portion into an approximation of a cylindrical helix, alternate transverse strips 103 between and beside the slits 102 being deformed and bowed, in opposite directions to form the sheet into an approximate cylinder, the line 101 thereby assuming the form of a helix.

It will be apparent from the present disclosure that electron emission tubes having screen and suppressor grids or other elements may also be used for the embodiment of my invention.

By the word "printed," as used in this specification, I intend to include the reproduction of a circuit of conductors and other elements upon a surface by a process whereby the conductors are made to adhere to the surface, as by painting, depositing, evaporating, spraying, sputtering, electrophotography, etc.

I claim:

1. An electronic radio frequency amplifier comprising a twin triode electron valve having its elements housed in an evacuated non-conducting envelope, input and output circuit means for said valve, said input circuit means comprising a grid resistor printed on the outer surface of the envelope connecting the grid and cathode elements of one triode by means of conductive leads printed on said outer surface, said output circuit means comprising an anode resistor printed on said outer surface, one end of said anode resistor connected to the anode of said one triode by means of a conductive lead printed on said surface, the opposite end of said anode resistor being connected to a power lead printed on said surface, an input conductive lead printed on said surface and having one end thereof connected to the grid of said one triode, an output conductive lead printed on said surface and having one end thereof connected to the anode of the second triode, a resistance-capacitance coupling means consisting of a capacitor affixed to said surface and coupling the anode of said one triode with the grid of said second triode by means of conductive leads printed on said surface, a resistor and its leads printed on said surface and connecting the anode of said second triode with said power lead, a second resistor and its leads printed on said surface connecting the grid and cathode of said second triode, each of said conductive leads and elements constituting said circuits and coupling means being printed on said surface in spaced relationship to each other.

2. An amplifier unit for electronic circuits comprising an electron emission twin triode device, including a glass envelope having a plurality of terminals thereon, a U-loop conductor formed on the face of the envelope, including a resistor on the face of the envelope having one end connected to the plate terminal of one triode and its other end connected to the grid terminal of said triode, a second U-loop formed on the face of the envelope, spaced circumferentially on the envelope from the first loop and including a resistor on the face of the envelope, the ends of the second loop being connected respectively to the grid and cathode terminals of the second triode, a B potential conductor extended transversely on the face of the envelope above said loops having one portion extended downwardly on the envelope and connected to one of said terminals on the envelope, a branch conductor on the face of the envelope from said B potential conductor between said loops connected to the anode terminal of the first triode and having a resistor therein on the face of the envelope, a capacitor attached to the face of the envelope having electrodes connected respectively to said branch conductor inwardly of said resistance therein, and to said second named loop inwardly of the resistance therein, the remaining end portion of said B potential conductor having a resistance therein on the face of the envelope and being extended on the envelope to the plate terminal of the second named triode.

CLEDO BRUNETTI.

REFERENCES CITED

The following references are of record in the file of this patent:

UNITED STATES PATENTS

| Number | Name | Date |
|---|---|---|
| 1,647,474 | Seymour | Nov. 1, 1927 |
| 1,837,678 | Ryder | Dec. 22, 1931 |
| 2,066,511 | Arlt | Jan. 5, 1937 |
| 2,220,961 | Kern | Nov. 12, 1940 |
| 2,377,893 | Lorenzen | June 12, 1945 |
| 2,441,960 | Eisler | May 25, 1948 |
| 2,468,727 | Bauman | May 3, 1949 |

FOREIGN PATENTS

| Number | Country | Date |
|---|---|---|
| 376,783 | Great Britain | July 14, 1932 |

OTHER REFERENCES

"Printed Circuit Wiring," April 1946 issue of "Electronic Industries," pages 90, 91, 120 and 122. (Copy in Div. 10.)

"Electronic Industries" Magazine, April 1946, page 122, lines 22–23.